March 15, 1955  M. P. WINTHER ET AL  2,704,344
MOTOR CONTROL SYSTEM
Filed June 14, 1954
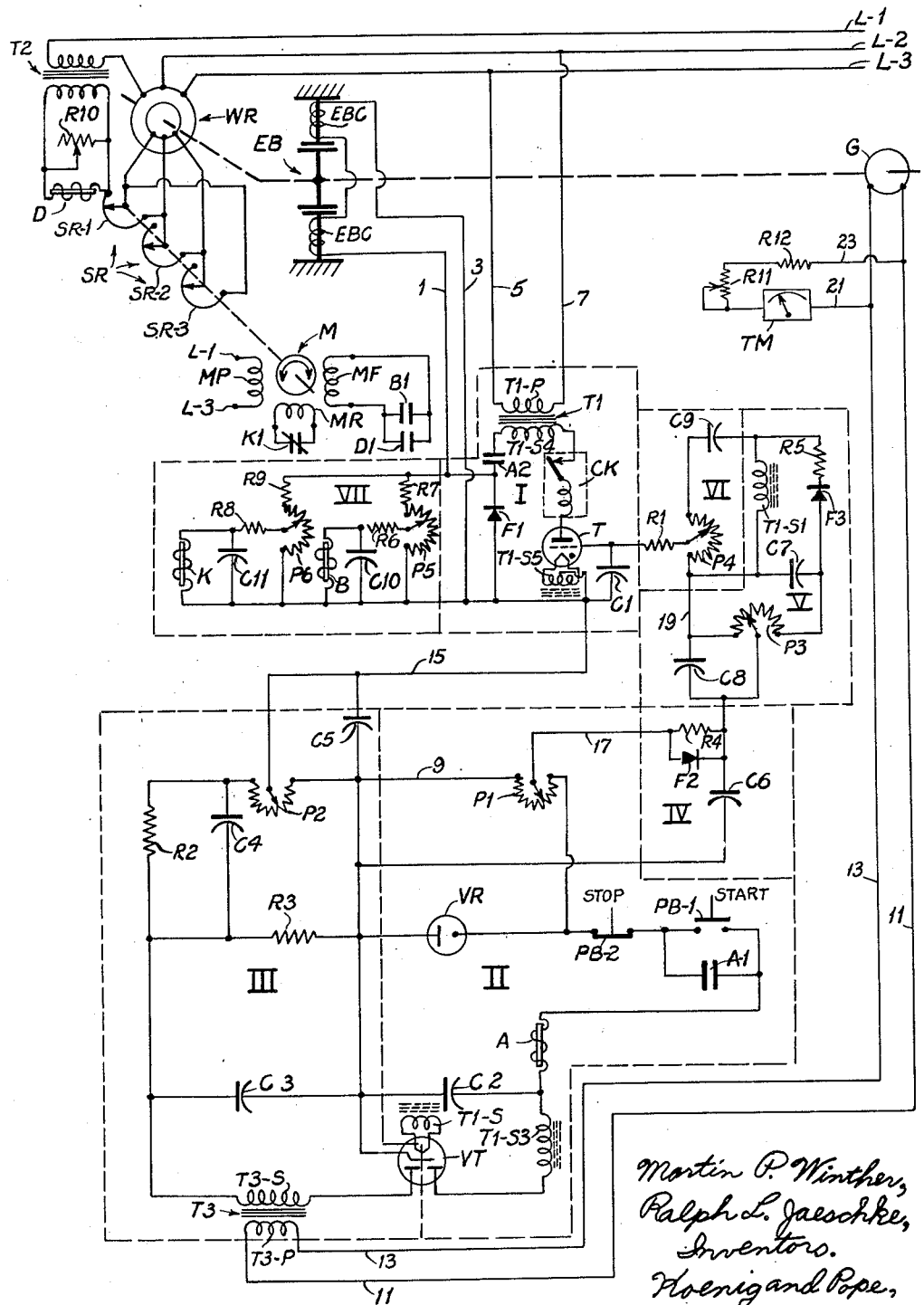

United States Patent Office 2,704,344
Patented Mar. 15, 1955

2,704,344

MOTOR CONTROL SYSTEM

Martin P. Winther, Gates Mills, Ohio, and Ralph L. Jaeschke, Kenosha, Wis., assignors to Eaton Manufacturing Company, Cleveland, Ohio, a corporation of Ohio Application June 14, 1954, Serial No. 436,676

13 Claims. (Cl. 318—204)

This invention relates to a control system and more particularly to a control system for a wound rotor induction motor.

Among the several objects of this invention may be noted the provision of a control system for a wound rotor induction motor which will maintain a shaft speed substantially constant over a wide range of shaft loading; the provision of a control system of the class described which can be adjusted to maintain any desired shaft speed selected from a wide range of speeds; the provision of such a control system in which the torque-speed characteristics of the wound rotor induction motor are varied continuously and automatically in response to varying loads; and the provision of a control system in which the wound rotor motor is protected from sustained or transient overloading. Other objects and features will be in part apparent and in part pointed out hereinafter.

Briefly, this invention is directed to a control system for a wound rotor induction motor arranged to drive a rotary shaft. The system includes an eddy-current brake for exerting a braking torque on the shaft and means responsive to the rotational speed of the shaft to vary the energization of the eddy-current brake. The control system also has a variable resistance and a reversible motor. The variable resistance is connected with the secondary winding of the wound rotor motor and operates to vary the speed-torque characteristics of this motor. The reversible motor is responsive to energization of the eddy-current brake and functions to adjust the variable resistance whereby the shaft speed is maintained substantially constant at a predetermined value over wide ranges of shaft loading.

The invention accordingly comprises the constructions hereinafter described, the scope of the invention being indicated in the following claims.

In the accompanying drawing, in which one of various possible embodiments of the invention is illustrated, the single figure illustrates a schematic circuit diagram of an exemplary control system of the present invention.

Referring more particularly to the drawing, a wound rotor induction motor is indicated by reference character WR. The primary of motor WR is connected to a source of A. C. power such as is indicated at L–1, L–2 and L–3. A current transformer T2 is connected in series with one of the three phases of this A. C. power supply and serves to produce a voltage proportional to the current drawn by the primary winding of motor WR. Associated with the secondary winding of motor WR is a variable resistance SR which comprises a series of variable resistors SR–1, SR–2 and SR–3. Each of these variable resistors is connected electrically across a separate phase of the secondary winding of WR so as to provide a means for changing the torque-speed characteristics of motor WR. An eddy-current brake EB, including a brake field coil EBC, is mechanically coupled to the shaft of motor WR. The braking torque applied to the shaft by brake EB is dependent on the degree of electrical energization or excitation of the brake coil EBC. Also coupled to the shaft of motor WR is an electrical generator G driven by or responsive to the rotation of the motor shaft. This generator G provides a speed-responsive control voltage or signal, the magnitude of which is a function of the shaft speed and which is employed to vary the energization of the brake coil EBC.

Brake field coil EBC is connected by wires 1 and 3 to a power rectifier section indicated at numeral I. Wires 1 and 3 interconnect coil EBC in a rectifier circuit including a gas-filled, grid-controlled thyratron rectifier tube T, a rectifier F1 and a secondary winding T1–S4 of a power transformer T1. A primary T1–P of transformer T1 is connected by wires 5 and 7 to L–2 and L–3. Also connected in power rectifier section I is a manual reset type circuit breaker CK, a set of contacts A2, a condenser C1, and a transformer secondary T1–S5. Section I rectifies A. C. power from the A. C. supply lines L–2, L–3 via transformer T1 to thyratron T to provide D. C. power to brake coil EBC. Because this brake field coil is highly inductive, rectifier F1 (preferably of the selenium type) is provided to supply a directional discharge path to maintain smooth current flow during the nonconductive half cycles of tube T. The degree of energization of coil EBC depends upon the magnitude of the D. C. voltage supplied to it by tube T which in turn is controlled by the voltage difference between the grid and the cathode (represented by the directly heated filament energized by center-tapped transformer secondary T1–S5). When this voltage difference or grid voltage is such that the grid of T is made relatively more positive with respect to its cathode, an increase in brake coil current results. Correspondingly, when the grid becomes more negative relative to the cathode, then conduction through the tube T and, therefore, current through EBC decrease.

The grid voltage which controls the conduction of tube T is a composite of the voltages of a reference voltage section II and a speed-responsive generator rectifier section III. The reference voltage section II includes a transformer secondary T1–S3 which supplies A. C. to a half-wave rectifier circuit including one anode and a cathode of a rectifier tube VT, a filter condenser C2 and a voltage regulator tube VR. Section II further includes a speed-setting potentiometer P1 and the coil of a relay A. A set of contacts A–1 and a pair of push button switches PB–1 and PB–2 (Start and Stop, respectively) are also connected in section II.

A wire 9 interconnects section II and speed-responsive generator section III. This latter section consists of a transformer T3, the primary of which is connected by leads 11 and 13 to speed-control generator G. A secondary T3–S of transformer T3 is connected in series with the other anode of VT and its cathode in a half-wave rectifier circuit including a filter condenser C3 and a speed-setting potentiometer P2. Also connected in section III is an antihunt network comprising a condenser C4 and a pair of resistors R2 and R3. A condenser C5 by-passes the rotor of potentiometer P2 to wire 9.

The D. C. reference voltage produced by section II is connected in opposition to that variable D. C. speed-responsive voltage produced by section III to provide a composite D. C. grid voltage for thyratron T. The circuit from the cathode of tube T to its grid includes a wire 15, a speed-responsive generator section III, wire 9, a reference voltage section II, a wire 17, a deceleration control section IV, a grid bias section V, a wire 19 and a rider wave or phase shift section VI.

The deceleration control section IV includes a network comprising a resistor R4 series-connected with a condenser C6 and a rectifier F2 shunt-connected across resistor R4. This network functions to prevent rapid changes in the grid voltage in a direction to make the grid of tube T more positive relative to the cathode.

Section V includes a transformer secondary T1–S1, a rectifier F3, a pair of condensers C7 and C8, a resistor R5 and a potentiometer P3 connected in a half-wave rectifier circuit to provide a D. C. potential between the rotor of potentiometer P3 and the wire 19 interconnecting sections V and VI. Section V merely provides an additional source of D. C. which is inserted in the grid-cathode circuit of T and serves to vary the initial operating point of thyratron tube T. The purpose of potentiometer P3 is to adjust the low-speed operating point of eddy-current brake EB.

A condenser C9 and a potentiometer P4, connected in a loop circuit with transformer winding T1–S1, comprise phase shift section VI which functions to superimpose an A. C. rider wave on the D. C. grid-control voltage supplied by sections II, III and V to thyratron T. Potentiometer P4 serves to adjust the amplitude of this rider wave and thereby functions as a sensitivity control.

A brake current responsive section VII is connected in shunt across brake coil EBC. Section VII includes a pair of voltage-sensitive relays B and K. A series circuit, including the coil of relay B, a resistor R6, a potentiometer P5 and a resistor R7, is connected in parallel with brake coil EBC. Another series circuit, including the coil of relay K, a resistor R8, a potentiometer P6 and a resistor R9, is also connected in parallel with brake coil EBC. Damping condensers C10 and C11 are connected across the coils of relays B and K, respectively, so as to eliminate the effect of undesirable voltage pulses across coil EBC. The purpose of these relays B and K is to operate respective associated pairs of relay contacts B1 and K1. These pairs of contacts are shown connected across a pair of windings MF and MR of reversible motor M. Motor M may be of any of the conventional A. C. or D. C. reversible motor types, but is preferably of the shaded pole type. Another winding MP of motor M is connected as indicated at L–1, L–3 to a source of A. C. power.

The coil of a third relay D and a variable resistor R10 are connected in a circuit across the secondary winding of current transformer T2. This circuit constitutes a motor overload protection device inasmuch as contacts D1 of relay D are connected in shunt with winding MF. Closure of contacts D1 causes reversible motor M to increase the effective resistance SR in the secondary winding of motor MR. Variable resistor R10 is preferably adjusted so that relay D will pick up (close) contacts D1 at approximately 150% of rated motor current and reopen them again at about the 100% level.

A means for measuring the shaft speed is provided by a voltmeter TM which is preferably calibrated in R. P. M. of shaft speed. Meter TM is connected in series with a rheostat R11 and a resistor R12, this series circuit being shunt-connected across speed-responsive generator G by wires 21 and 23.

Operation is as follows:

Upon manually pressing switch PB–1 the half-wave rectifier circuit of section II is completed (provided that sufficient delay is allowed for the heating of the cathode of tube VT) through the coil of relay A. The resulting actuation of relay A closes its associated contacts A1, A2. Closure of contacts A2 permits energization of section I while closure of contacts A1 completes a holding circuit across switch PB–1 to maintain the circuit after this switch is released. Deactuation of the control system can be accomplished merely by momentarily depressing the STOP push button switch PB–2. When the primary winding of the wound rotor induction motor WR is thus connected to a source of A. C. power, the secondary winding thereof will be inductively energized to drive the motor shaft, the rotary member of the eddy-current brake EB, the rotor of speed-responsive generator G and whatever load is applied to the shaft of motor WR. The speed of the shaft of motor WR is dependent on a multitude of factors including principally: the load; the energization level of the eddy-current brake coil EBC; the positioning of secondary resistance SR by reversible motor M; and, the adjustment of speed-setting potentiometer P1. With the rotor of P1 in its maximum clockwise position, the shaft should be stationary, assuming that the rotors of potentiometers P3 (which set the initial operating point) and P4 (sensitivity) are properly adjusted. Under such conditions the potential or voltage level of the grid of thyratron tube T relative to the cathode is such that the brake coil EBC is energized to a level which will apply a braking torque that is a small, fixed (e. g., approximately a 10% to 20%) portion of the normal rated torque capacity of the brake EB. The D. C. voltage produced by section III is zero and the meter TM indicates zero R. P. M. shaft speed. The secondary resistance SR of reversible motor WR under these conditions would be such as to energize motor WR to a degree sufficient to balance the low level of braking torque applied to its shaft by EB and the effect of any other load on its shaft.

If the rotor of speed-setting potentiometer P1 is rotated counterclockwise to a first predetermined voltage position, the immediate effect is to make the grid of thyratron tube T more negative and decrease conduction of tube T and, therefore, the current through brake field coil EBC. This resulting decreased braking torque causes the shaft to accelerate and approach the speed preset by the rotor of P1. As the speed of the shaft of motor WR increases so also does the D. C. voltage developed across P2 of section III (because of increasing A. C. voltage generated by G). As this now-rising speed-responsive D. C. voltage is connected in bucking opposition to the preset reference voltage of section II, the net grid bias is decreased, which thereby increases the conduction of tube T and the braking effect of brake EB on the shaft so that it levels off at the preset speed. Any variation in the load on the motor shaft will cause a compensating variation in the energization of EBC tending to maintain it substantially constant at any speed preset by the rotor of P1, and indicated on voltmeter or tachometer TM. The network of resistors R2 and R3, potentiometer P2 and condenser C4 acts to prevent hunting.

Reversible motor M, the variable secondary resistance SR and brake responsive section VII operate in conjunction and cooperation with the aforesaid components to provide a smooth, easily adjustable control system which maintains the speed of the shaft substantially constant at any speed within the wide range that can be preset by the rotor of potentiometer P1. The control system of the present invention utilizes the voltage developed across the brake field coil EBC to operate relays B and K and thereby continuously control the amount of secondary resistance SR by actuation of reversible motor M. The rotor of potentiometer P6 is adjusted so that the coil of relay K is energized to pick up or actuate its contacts K1 to an open condition (from their normally closed position) upon the voltage across field coil EBC exceeding a low predetermined voltage. The rotor of potentiometer P5 is adjusted so that the coil of relay B is energized to actuate contacts B1 to a closed position (from their normally open condition) when the voltage exceeds a high predetermined value.

When the voltage across the field coil EBC is between the aforesaid two predetermined values, contacts K1 and B1 are both opened and motor M remains deenergized. The voltage across the eddy-current brake field coil EBC will rise above the high predetermined value anytime that the torque supplied by the wound rotor motor WR exceeds the amount needed to maintain the shaft speed constant at the load conditions instantaneously prevailing. Upon such a voltage increase across EBC, contacts B1 are actuated to a closed position thereby energizing reversible motor M to rotate resistors SR1, SR2 and SR3 to a greater value of secondary resistance. This action decreases the torque output of motor WR and results in the need for less braking torque from EB. The decreased braking torque decreases the voltage drop across coil EBC below a level which will maintain the coil of relay K energized.

The operation of reversible motor M in a reversed direction (to decrease the secondary resistance and thereby increase the torque output thereof to the shaft) will result whenever the voltage across EBC decreases below the low predetermined level set by the rotor of P6. Such a condition will occur when the shaft loading suddenly increases. The deenergization of the coil of relay K, which follows, permits contacts K1 to close, thus energizing reversible motor M to increase the torque output (by decreasing the resistance SR applied to the secondary winding of WR).

Thus, it can be seen that the actions of the brake EB and secondary resistance SR are cooperative and in a practical sense cumulative. For example, when a sudden load increase causes a decrease in the shaft speed, the eddy-current brake current is decreased to decrease the braking effect, and the resulting lowered voltage across EBC (if lower than the low predetermined value needed for energizing relay K) causes concurrent increased driving torque (by decreasing the secondary resistance SR of motor WR).

Therefore, the control of the present invention maintains the shaft speed substantially constant regardless of load variations by combining the effect of continuous variation of the secondary resistance of motor WR in conjunction with the effect of varying the eddy-current braking torque on the shaft. Under steady-state conditions, the brake coil EBC is energized at only a nominal level, such as 10% to 20% of its normal maximum rated torque capabilities, and the resistance SR across the secondary winding is maintained at an adjustment that will maintain the torque output of motor WR at a level to just balance the above-mentioned nominal braking torque plus the applied shaft load.

Two other important features of the present invention are emphasized by the advantageous operation of this control system under conditions where either the safe torque-delivering capabilities of the motor WR are exceeded or tend to be exceeded in a transient sense. The application of a load in excess of a predetermined torque level (e. g., 150% of rated torque) of motor WM (as preset by variable resistor R10) results in a value of current being drawn by the primary of motor WM through current transformer T2 which will produce a high enough voltage across the coil of relay D to actuate contacts D1 to a closed position. The closure of these contacts actuates reversible motor RM in a direction to increase the resistance across the secondary winding and thereby decrease the torque output of WR. The provision of deceleration section IV avoids a possible transient overload condition that would result if the rotor of P1 were rapidly moved from a high shaft speed position toward a zero speed (maximum clockwise) position. If permitted, such rapid movement would immediately apply full brake excitation and cause motor WR to draw an excessive value of current until sufficient time is allowed for movement of variable secondary resistance SR to increase its value to reduce the torque output of WR.

This is prevented by limiting the rate of grid voltage change in a direction to make the grid more positive. The effect on the grid voltage by rapid movement of the rotor of P1 toward the zero position is delayed by the RC network made up of R4 and C6. Condenser C6 must be discharged through R4 and thus the rate of decrease in voltage transmitted to the grid of thyratron T is not the same as the rate of movement of the rotor of potentiometer P1. Due to the time constant of discharge through R4, the grid voltage follows an exponential curve determined by the RC values. As a rapid movement of the rotor of P1 in a counterclockwise direction will not produce overloading of motor WR, the rectifier F2 (which offers high impedance to discharge of condenser C6) shunts R4 to provide a low impedance path for rapid charge of condenser C6. Therefore, a rapid increase in the D. C. reference voltage in a direction to make the grid more negative causes a correspondingly rapid increase in the voltage applied to the grid of thyratron T.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

I claim:

1. A control system for a wound rotor induction motor arranged to drive a rotary shaft and having a primary and a secondary winding, said system comprising an eddy-current brake adapted to exert a braking torque on said shaft, means responsive to the rotational speed of said shaft to vary the energization of said eddy-current brake, a variable resistance connected with said secondary winding to vary the speed-torque characteristics of said motor, and a reversible motor responsive to energization of said eddy-current brake to adjust said variable resistance whereby said shaft speed is maintained substantially constant at a predetermined value over wide ranges of shaft loading.

2. A control system for a wound rotor induction motor arranged to drive a rotary shaft and having a primary and a secondary winding, said system comprising an eddy-current brake adapted to exert a braking torque on said shaft, means responsive to the rotational speed of said shaft to vary the energization of said eddy-current brake, a variable resistance connected with said secondary winding to vary the speed-torque characteristics of said motor, a reversible motor for adjusting said variable resistance, and means responsive to energization of said eddy-current brake to adjust said variable resistance whereby said shaft speed is maintained substantially constant at a predetermined value over wide ranges of shaft loading.

3. A control system as set forth in claim 2 wherein the first said means includes an electrical generator driven at a speed proportional to that of said shaft.

4. A control system as set forth in claim 2 wherein the first said means includes an electrical generator driven by said shaft and adapted to produce a first D. C. voltage proportional to the speed of said shaft, and a source of a second D. C. voltage connected in bucking opposition to said first D. C. voltage.

5. A control system as set forth in claim 2 wherein the second said means includes at least one electrical relay connected in a circuit with said eddy-current brake and adapted when actuated to energize said reversible motor in one direction.

6. A control system as set forth in claim 2 wherein the second said means includes a pair of electrical relays connected in a circuit with said eddy-current brake and adapted to energize said reversible motor in one direction upon actuation of a first of said relays and in a reverse direction upon actuation of the other of said relays.

7. A control system for a wound rotor induction motor arranged to drive a rotary shaft and having a primary winding connected to a source of alternating current and a secondary winding, said system comprising an eddy-current brake adapted to exert a braking torque on said shaft, a first circuit responsive to the rotational speed of said shaft to vary the energization of said eddy-current brake, said circuit including an electrical generator driven by said shaft and adapted to produce a first D. C. voltage proportional to the speed of said shaft and a source of a second D. C. voltage connected in bucking opposition to said first D. C. voltage, a variable resistance connected with said secondary winding to vary the speed-torque characteristics of said motor, a reversible motor for adjusting said variable resistance, and a second circuit responsive to energization of said eddy-current brake to energize said reversible motor, said second circuit including at least one electrical relay interconnected with said eddy-current brake and adapted when actuated to energize said reversible motor in one direction whereby said shaft speed is maintained substantially constant at a predetermined value over wide ranges of shaft loading.

8. A control system as set forth in claim 7 which further includes means responsive to the current drawn by said primary winding and adapted to energize said reversible motor in a direction to increase the resistance in said secondary winding whenever the current drawn by said primary winding exceeds a predetermined value.

9. A control system as set forth in claim 7 which further includes an adjustable resistor connected with said second D. C. voltage source and adapted to vary said second D. C. voltage thereby to adjust said predetermined value of shaft speed to any desired speed selected from a wide range of speeds.

10. A control system as set forth in claim 9 which further includes a resistor and a capacitor series-connected across said second D. C. voltage source, and a rectifier shunt-connected across said resistor whereby a rapid increase in said second D. C. voltage rapidly decreases the energization of the eddy-current brake but a rapid decrease in the second D. C. voltage will result in a slow increase of the energization of the eddy-current brake.

11. A control system for a wound rotor induction motor arranged to drive a rotor shaft and having a primary winding connected to a source of A. C. current and a secondary winding, said system comprising an eddy-current brake adapted to exert a braking torque on said shaft, a first circuit responsive to the rotational speed of said shaft to vary the energization of said eddy-current brake, said circuit including an electrical generator driven by said shaft and adapted to produce a first D. C. voltage proportional to the speed of said shaft and a source of a second D. C. voltage connected in bucking opposition to said first D. C. voltage, a variable resistance connected with said secondary winding to vary the speed-torque characteristics of said motor, a reversible motor for adjusting said variable resistance, and a second circuit responsive to energization of said eddy-current brake to energize said reversible motor, said second circuit including a pair of electrical relays connected in a circuit with said eddy-current brake and adapted to energize said reversible motor in one direction upon actuation of a first of said relays and in a reverse direction upon actuation of a second of said relays whereby said shaft speed is maintained substantially constant at a predetermined value over wide ranges of shaft loading.

12. A control system as set forth in claim 11 which further includes a current transformer series-connected with the A. C. power source and a relay connected in a circuit with said current transformer adapted to energize said reversible motor thereby to increase the resistance across said secondary winding whenever the current requirements of said wound rotor motor exceed a predetermined value.

13. A control system as set forth in claim 11 which further includes a resistor and a capacitor series-connected across said second D. C. voltage source, and a rectifier shunt-connected across said resistor whereby a rapid increase in said second D. C. voltage rapidly decreases the energization of the eddy-current brake but a rapid decrease in the second D. C. voltage will result in a slow increase of the energization of the eddy-current brake.

No references cited.